(12) United States Patent
Hanawa

(10) Patent No.: US 12,253,122 B2
(45) Date of Patent: Mar. 18, 2025

(54) SELECTABLE CLUTCH

(71) Applicant: TSUBAKIMOTO CHAIN CO., Osaka (JP)

(72) Inventor: Yuto Hanawa, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 0 days.

(21) Appl. No.: 18/519,258

(22) Filed: Nov. 27, 2023

(65) Prior Publication Data

US 2024/0247692 A1  Jul. 25, 2024

(30) Foreign Application Priority Data

Jan. 24, 2023  (JP) ................................. 2023-008717

(51) Int. Cl.
*F16D 41/07* (2006.01)
*F16D 41/06* (2006.01)
*F16D 41/08* (2006.01)

(52) U.S. Cl.
CPC ...... *F16D 41/07* (2013.01); *F16D 2041/0603* (2013.01); *F16D 41/084* (2013.01)

(58) Field of Classification Search
CPC ........... F16D 41/069–073; F16D 41/08; F16D 41/084; F16D 41/0603
See application file for complete search history.

(56) References Cited

U.S. PATENT DOCUMENTS

| | | | | |
|---|---|---|---|---|
| 3,164,234 A | * | 1/1965 | Tamarin ................. | F16D 41/07 192/36 |
| 3,165,183 A | * | 1/1965 | Clements ................ | F16D 41/07 192/105 R |
| 4,089,395 A | * | 5/1978 | Fogelberg ............. | F16D 41/084 192/41 A |
| 7,506,738 B2 | * | 3/2009 | Muramatsu ............ | F16D 41/07 192/41 A |
| 8,753,240 B2 | * | 6/2014 | Kato ..................... | B60W 20/00 475/8 |

FOREIGN PATENT DOCUMENTS

| | | | | |
|---|---|---|---|---|
| JP | H06193657 A | * | 7/1994 | ............. F16D 41/07 |
| JP | 2869293 B2 | * | 11/1994 | ............. F16D 41/07 |
| JP | 3629311 B2 | * | 3/2005 | ............. F16D 41/07 |
| JP | 2011-231828 A | | 11/2011 | |
| JP | 2021-141508 A | | 9/2021 | |
| JP | 2022-45461 A | | 3/2022 | |

* cited by examiner

*Primary Examiner* — James J Taylor, II
(74) *Attorney, Agent, or Firm* — WHDA, LLP

(57) ABSTRACT

A selectable clutch that enables an improvement in the performance of maintaining orientations of cams, and allows simplification of the structure of biasing mechanism, as well as reduction of the thrust required for the switching of operating modes is provided. The selectable clutch includes a plurality of cams circumferentially held by a cage ring between an inner race and an outer race, and biased in an engaging direction by a biasing mechanism. The cams are each configured to have the center of gravity located such that each of the cams functions as an engaging type cam when oriented in engagement with the inner race and the outer race, and such that each of the cams functions as a disengaging type cam in a tilted freewheel orientation not to contact with the inner race or the outer race.

5 Claims, 4 Drawing Sheets

Related Art

SELECTABLE CLUTCH

BACKGROUND OF THE INVENTION

1. Field of the Invention

The present invention relates to a selectable clutch configured to be able to switch an operation mode between an engaged mode capable of torque transmission between an inner race and an outer race, and a freewheel mode that interrupts the torque transmission between the inner and outer races.

2. Description of the Related Art

In a selectable clutch that uses cams as engaging elements, the cams are biased by a suitable biasing means so as to make contact with the inner race and outer race. The cams are tilted into wedging engagement to contact with the inner race and outer race so that torque is transmitted by the cams wedging against the inner race and outer race, whereby the cams are forcibly tilted not to contact with the inner race or the outer race by a suitable selector, thereby making the clutch freewheel. Thus the operating mode of the clutch can be switched between the engaged mode and the freewheel mode. Such a selectable clutch is proposed in Japanese Patent Application Publication No. 2011-231828, for example.

According to a purpose of use, a selectable clutch may employ either an engaging or disengaging type cam configuration.

An "engaging type" cam is configured to have, as shown in FIG. 5, the center of gravity G located on the opposite side (right side in FIG. 5) to an inner contact point C2 of contact between the cam 230 and the inner raceway 111 relative to a normal line H extending through an outer contact point C1 of contact between the cam 230 and the outer raceway 121. The cam 230 tilts itself in the engaging direction (counterclockwise in FIG. 5) by the rotational moment M of inertia when a centrifugal force is applied.

The "engaging type" cam 230 is configured to maintain a state of contact with the inner raceway 111 and outer raceway 121 at all times irrespective of orientation thereof, i.e., whether the cam 230 is wedging or freewheeling, with the center of gravity G being located on the opposite side to the inner contact point C2 relative to the normal line H extending through the outer contact point C1.

On the other hand, a "disengaging type" cam is configured to have, as shown in FIG. 6, the center of gravity G located on the same side as the inner contact point C2 (left side in FIG. 6) relative to the normal line H extending through the outer contact point C1 of contact between the cam 230 and the outer raceway 121. The cam 230 tilts itself in the disengaging direction (clockwise in FIG. 6) by the rotational moment M of inertia when a centrifugal force is applied.

The "disengaging type" cam 230 always has the center of gravity G located on the same side as the inner contact point C2 relative to the normal line H extending through the outer contact point C1 irrespective of orientation thereof, i.e., whether the cam 230 is wedging or freewheeling. When a centrifugal force is applied, the cam 230 separates from the inner raceway 111 against the biasing force of the biasing means (not shown).

SUMMARY OF THE INVENTION

A selectable clutch that employs "engaging type" cams requires a biasing means that can provide a sufficient biasing force to maintain the cams not to contact with the inner raceway when the clutch is in the freewheel mode. Moreover, since the cams are always in contact with the inner race and outer race, generally a large thrust is required for switching the selectable clutch into the freewheel mode.

On the other hand, a selectable clutch that employs "disengaging type" cams requires a biasing force to keep the cams in contact with the inner raceway when the cams are wedging against the inner race and outer race, to prevent the cams from separating (lifting up) from the inner raceway by the action of a centrifugal force. Further, even a larger thrust is required for switching the operating modes of the selectable clutch with disengaging type cams as compared to the selectable clutch with engaging type cams.

Whether the cams used in the clutch are the engaging type or disengaging type, under the circumstances, there are limitations regarding the biasing force required of the biasing means, and the thrust required for the switching of operating modes.

The present invention was made in view of the circumstances described above, and it is an object of the invention to provide a selectable clutch that enables an improvement in the performance of the cams in maintaining their orientations, and allows simplification of the structure of biasing means, as well as reduction of the thrust required for the switching of operating modes.

The present invention solves the above problems by providing a selectable clutch including: an inner race and an outer race provided to be coaxial and rotatable relative to each other; a plurality of cams disposed between the inner race and the outer race; a cage ring circumferentially holding the plurality of cams; a biasing means biasing each of the plurality of cams such that the plurality of cams come into contact with the inner race and the outer race; and a selector configured to be able to forcibly tilt each of the plurality of cams. The plurality of cams are each configured to have a center of gravity located such that each of the cams functions as an engaging type cam when the cams are oriented in engagement with the inner race and the outer race, and such that each of the cams functions as a disengaging type cam when the cams are in a tilted freewheel orientation not to contact with the inner race (for example, FIG. 3) or the outer race (for example, FIG. 7B).

According to the present invention, the plurality of cams are each configured to have the center of gravity located such as to make the cams function as an engaging type cam when the cams are oriented in engagement with the inner race and outer race. Since the rotational moment of inertia acts in the same direction as the biasing force of the biasing means when a centrifugal force is applied, the cams can be engaged with the inner race and outer race reliably during high speed rotation. The plurality of cams are each configured also to have the center of gravity located such as to make the cams function as a disengaging type cam when the cams are tilted into the freewheel orientation not to contact with the inner race or the outer race. Since the rotational moment of inertia acts in a direction to separate the cams from the inner race when a centrifugal force is applied, the cams can reliably be maintained not to contact with the inner race. Thus the cam performance in maintaining its orientation, whether engaging or freewheeling, can be improved.

When the cams are oriented in engagement with the inner race and outer race, the cams function as an engaging type cam. This means that the clutch is free of the limitations associated with disengaging type cams regarding the biasing force required of the biasing means, and is less affected by the centrifugal force. Therefore, the spring structure can be made more simple, or the spring materials can be reduced in diameter or thickness.

Moreover, since biasing means with a smaller biasing force can be employed, the thrust required for tilting the cams and switching the operating modes can be reduced, which enables electrification of the switching system or reduction in size of the switching power system.

DESCRIPTION OF THE PREFERRED EMBODIMENTS

A selectable clutch according to the present invention will be hereinafter described with reference to the drawings.

Figure 1:
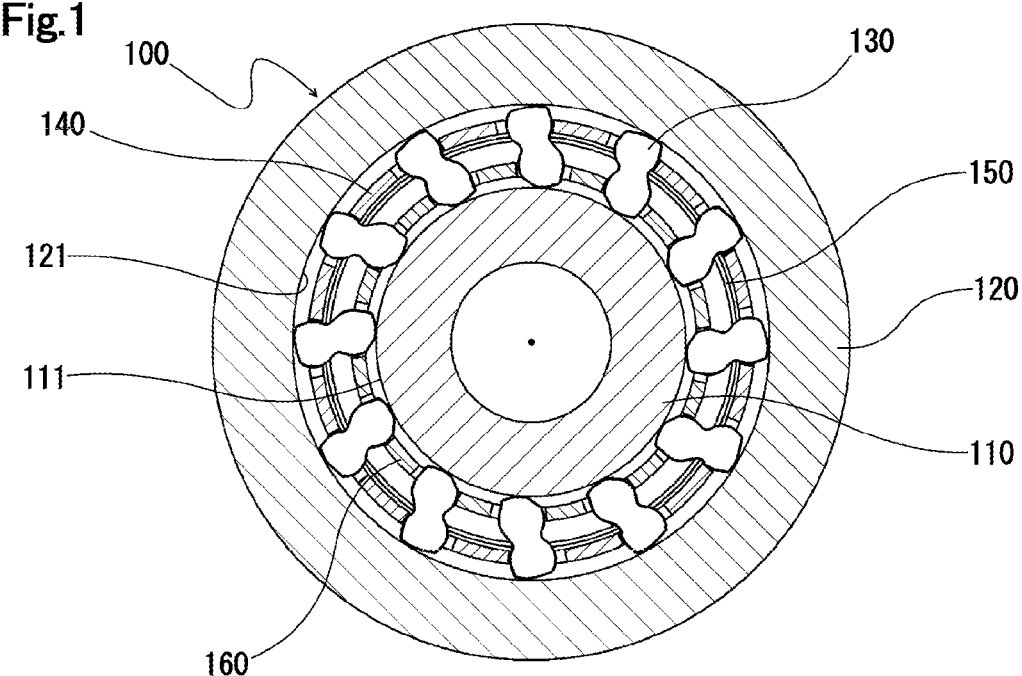
FIG. 1 is a cross-sectional view illustrating one configuration example of a selectable clutch according to the present invention in a plane perpendicular to the center axis.

FIG. 1 is a cross-sectional view illustrating one configuration example of a selectable clutch according to the present invention in a plane perpendicular to the center axis.

This selectable clutch 100 includes: an inner race 110 and an outer race 120 coaxial and rotatable relative to each other; a plurality of cams 130 disposed in an annular space between an inner raceway 111 and an outer raceway 121; a cage ring 140 holding the plurality of cams 130 at circumferential intervals; a biasing means 150 biasing each of the plurality of cams 130 into contact with the inner race 110 and outer race 120; and a selector 160 configured to be able to forcibly tilt each of the plurality of cams 130.

Figure 2:
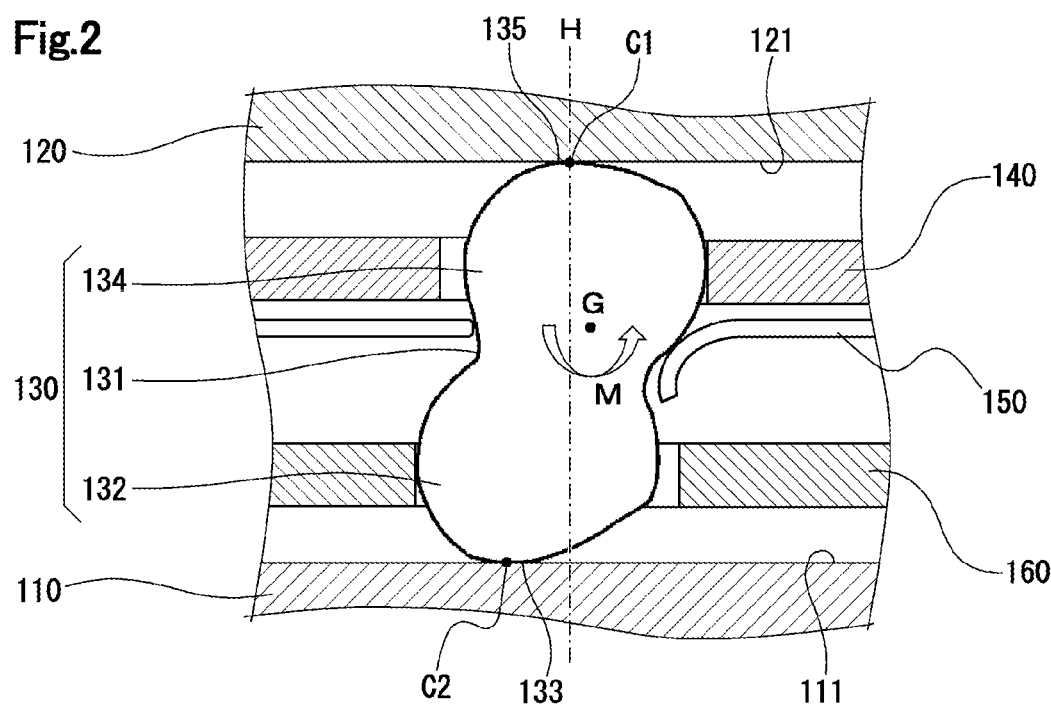
FIG. 2 is a diagrammatic view illustrating a cam in the engaged orientation.

The cams 130 have a substantially figure-eight shape in plan as viewed from the axial direction as shown in FIG. 2, with a constricted part 131 in a radially central portion. A leg part 132 on the radially inner side of the constricted part 131 has an inner race engaging surface 133. Arcuately curved side faces smoothly continue from the inner race engaging surface 133 and make contact with the selector 160.

A head part 134 on the radially outer side of the constricted part 131 has an outer race engaging surface 135. Arcuately curved side faces smoothly continue from the outer race engaging surface 135 and make contact with the cage ring 140.

The cage ring 140 is disposed in the annular space between the inner race 110 and the outer race 120 coaxially with the inner race 110 and outer race 120. The cage ring is spaced away from the outer raceway 121, and fixed to the outer race 120 to rotate with the outer race 120.

The cage ring 140 includes cam holding parts that accommodate the head parts 134 of the cams 130 and hold the cams 130 such as to be rollable. The cam holding parts are circumferentially equally spaced, for example.

The biasing means 150 is a ribbon spring, for example. The biasing means 150 may be any resilient member that can bias the cams 130 in the engaging direction, such as a garter spring, for example. The biasing means 150 need not be a single component shared by the plurality of cams 130 but can be formed by a plurality of plate springs or torsion springs, for example, each corresponding to each of the cams 130.

The selector 160 is configured to be movable, for example in the circumferential direction, independently of the rotation of the inner race 110 and outer race 120. This movement of the selector allows the selectable clutch 100 to be switchable between the one-way engaged mode capable of transmitting torque between the inner race 110 and the outer race 120 in either the forward direction or the reverse direction, and the two-way freewheel mode that interrupts the torque transmission between the inner race 110 and the outer race 120. The selector 160 may be configured such as to be axially movable independently of the rotation of the inner race 110 and outer race 120.

The selector 160 includes cam holding parts that accommodate and hold the leg parts 132 of the cams 130. The cam holding parts are circumferentially equally spaced, for example.

The cams 130 in the selectable clutch 100 according to this embodiment are designed to have the center of gravity G located such that the plurality of cams 130 each function as an engaging type cam when the cams 130 are oriented in engagement with the inner race 110 and outer race 120, and such that the plurality of cams 130 each function as a disengaging type cam when the cams 130 are in a tilted freewheel orientation not to contact with the inner race 110 or the outer race 120.

More specifically, according to this embodiment, when the operating mode of the selectable clutch 100 is the one-way engaged mode, as shown in FIG. 2, the center of gravity G of the cam is located on the opposite side (right side in FIG. 2) from an inner contact point C2 between the cam 130 and the inner race 110, of a normal line H at an outer contact point C1 between the outer race engaging surface 135 of the cam 130 and the outer raceway 121, so that the cam 130 tilts in the engaging direction (counterclockwise in FIG. 2) by the rotational moment M of inertia when a centrifugal force is applied. Namely, the cams 130 function as an engaging type cam. The rotational moment M of inertia acts in the same direction as the biasing force of the biasing means 150 when the centrifugal force is applied. Therefore, the cams 130 can be engaged with the inner race 110 and outer race 120 reliably during high speed rotation.

Figure 3:
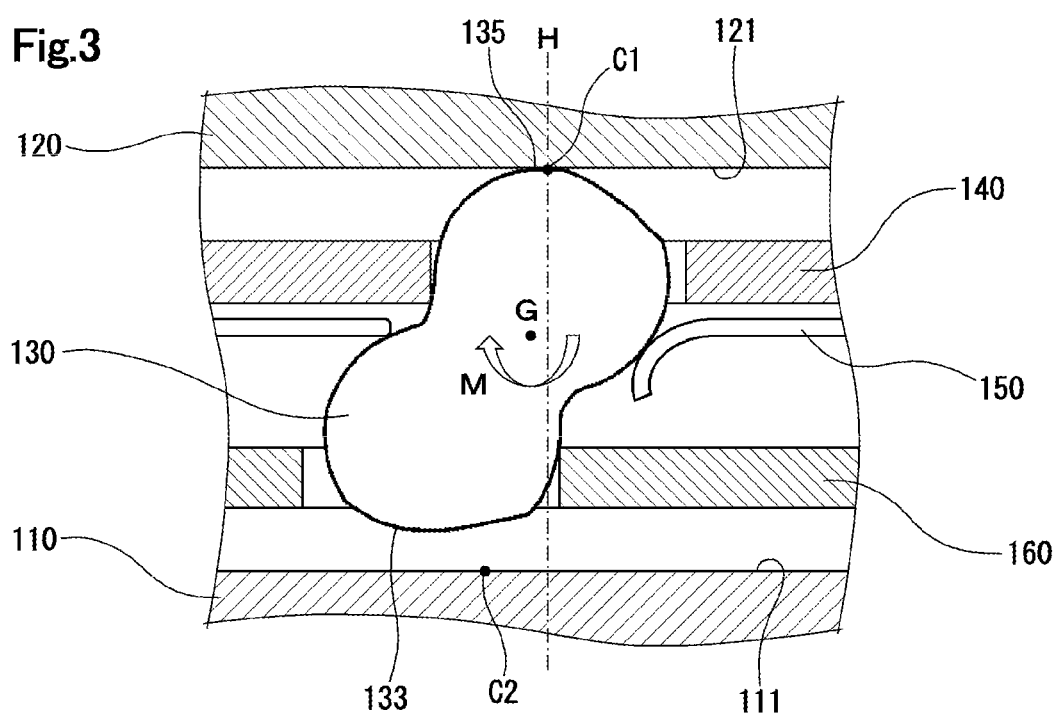
FIG. 3 is a diagrammatic view illustrating the cam tilted to the freewheel orientation.

Driving the selector 160 causes the inner race engaging surface 133 of the cams 130 to separate from the inner raceway 111 as shown in FIG. 3, i.e., causes the cams 130 to tilt to the freewheel orientation not to contact with the inner race 110, thus switching the operating mode of the selectable clutch 100 from the one-way engaged mode to the two-way freewheel mode.

When the operating mode is the two-way freewheel mode, the center of gravity G of the cam is located on the same side as the inner contact point C2 that is where the cam 130 and the inner race 110 contact when they engage (left side in FIG. 3), of the normal line H at the outer contact point C1 between the outer race engaging surface 135 of the cam 130 and the outer raceway 121. The cam 130 tilts in the disengaging direction (clockwise in FIG. 3) by the rotational moment M of inertia when a centrifugal force is applied. Namely, the cams 130 function as a disengaging type cam. The rotational moment M of inertia acts in the direction to separate the cams 130 from the inner race 110 when the centrifugal force is applied. Therefore, the cams 130 can reliably be maintained not to contact with the inner race 110.

The center of gravity G of the cam is located on the radially outer side of the constricted part 131 (closer to the cage ring 140). This ensures even more reliable performance of the cams 130 in maintaining their orientations.

As described above, the cams 130 in the selectable clutch 100 according to this embodiment are configured to have the center of gravity G located such that the plurality of cams 130 each function as an engaging type cam when the cams 130 are each oriented in engagement with the inner race 110 and outer race 120, and such that the cams 130 each function as a disengaging type cam when the cams 130 are each in a freewheel orientation not to contact with the inner race 110. This feature allows the cams 130 to exhibit improved performance in maintaining their orientations.

When the cams 130 are oriented in engagement with the inner race 110 and outer race 120, the cams 130 function as an engaging type cam. This means that the clutch is free of the limitations associated with disengaging type cams regarding the biasing force required of the biasing means 150, and is less affected by the centrifugal force. Therefore, the spring structure of the biasing means 150 can be made more simple, or the spring materials can be reduced in diameter or thickness.

It also follows that biasing means 150 with a smaller biasing force can be employed, which enables a reduction in the thrust required for tilting the cams 130 and switching the operating modes. This means that the switching system can be electrified, or the switching power system can be reduced in size.

While one embodiment of the present invention has been described in detail, the present invention is not limited to the above-described embodiment and may be carried out with various design changes without departing from the scope of the present invention set forth in the claims.

For example, instead of being switchable between two, one-way engaged and two-way freewheel, operating modes as with the selectable clutch of the embodiment described above, the selectable clutch may be configured to be switchable between three operating modes, including a two-way engaged mode capable of transmitting torque in both forward and reverse directions. Alternatively, the clutch may be configured to be switchable between four operating modes, including a one-way engaged mode capable of transmitting torque in the forward direction, and a one-way engaged mode capable of transmitting torque in the reverse direction.

Figure 4:
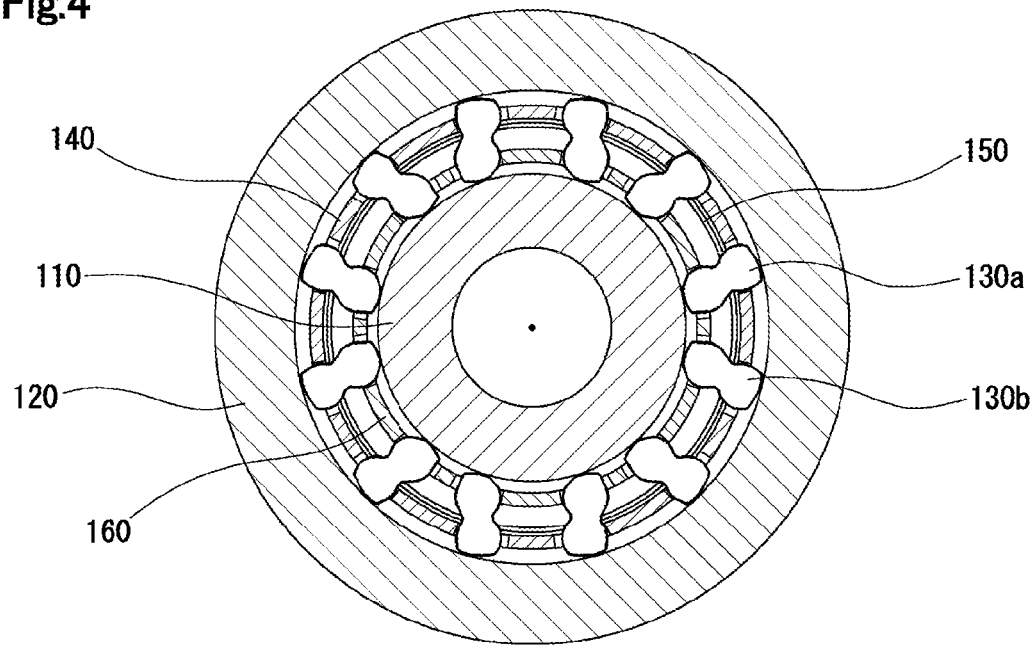
FIG. 4 is a cross-sectional view illustrating another configuration example of a selectable clutch according to the present invention in a plane perpendicular to the center axis.
Figure 5:
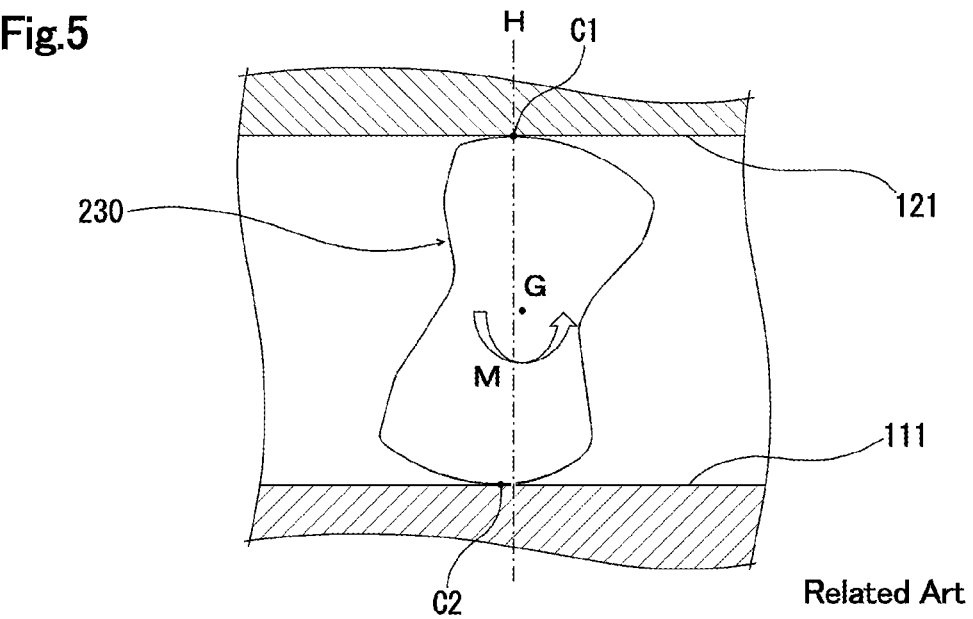
FIG. 5 is a diagrammatic view illustrating one configuration example of an engaging type cam.
Figure 6:
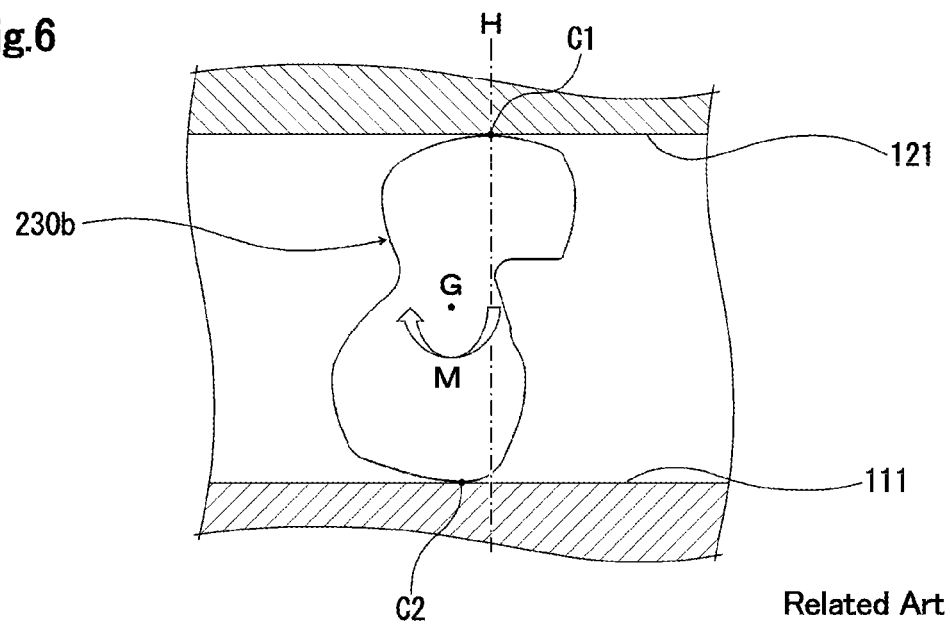
FIG. 6 is a diagrammatic view illustrating one configuration example of a disengaging type cam.
Figure 7A:
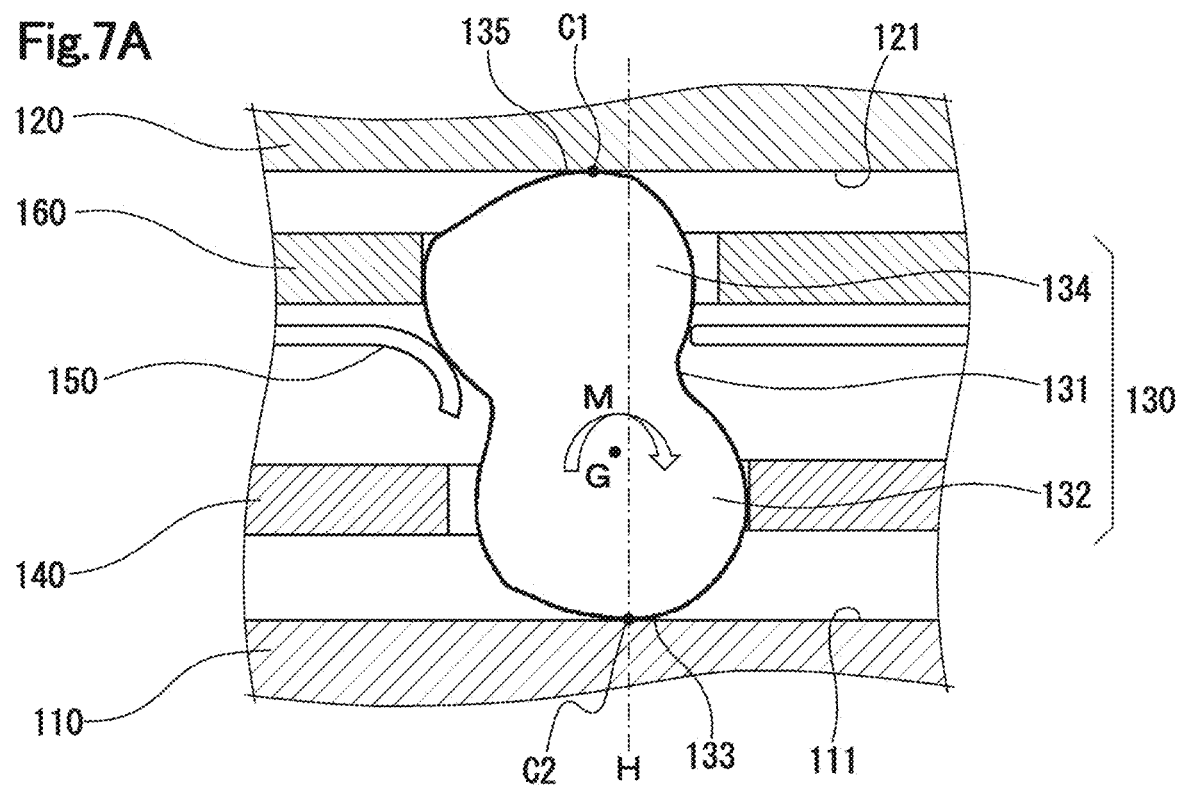
FIG. 7A is a diagrammatic view illustrating a cam in the engaged orientation.
Figure 7B:
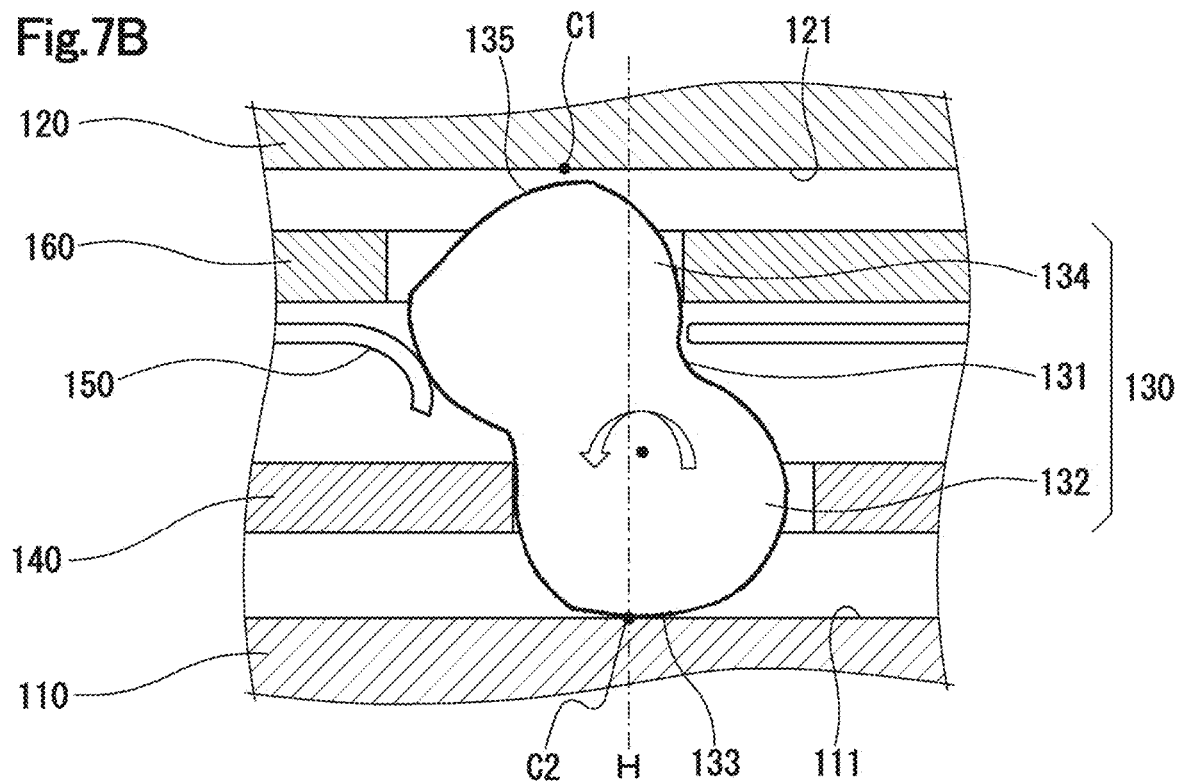
FIG. 7B is a diagrammatic view illustrating the cam tilted to the freewheel orientation.

FIG. 4 shows one configuration example of a selectable clutch configured to be switchable between three operating modes, i.e., two-way engaged mode, one-way engaged-mode, and two-way freewheel mode.

This selectable clutch 100 has first cams 130a and second cams 130b that engage with the inner race 110 and outer race 120 in different directions. The first cams 130a and second cams 130b have outer shapes that are identical to each other, for example, the first cams 130a reversed front to back being used as the second cams 130b.

The selector 160 is configured to be axially movable, for example, independently of the rotation of the inner race 110 and outer race 120. The cam holding parts that are openings have a shape configured such that a stepwise axial movement of the selector 160 changes the orientation of the first cams 130a and the second cams 130b independently of each other. Thus the clutch can be switched between three operating modes.

The first cams 130a and second cams 130b are each configured to have the center of gravity located such that the cams function as an engaging type cam when the cams are oriented in engagement with the inner race 110 and outer race 120, and such that the cams function as a disengaging type cam when the cams are in a tilted freewheel orientation not to contact with the inner race 110 or the outer race 120.

This selectable clutch 100 also enables an improvement in the performance of the cams 130 in maintaining their orientations, and allows simplification of the structure of biasing means 150, as well as reduction of the thrust required for the switching of operating modes.

The selectable clutch according to the present invention described above is applicable to any of the configurations in which the inner race is fixed and the outer race is rotated, in which the outer race is fixed and the inner race is rotated, or in which both of the inner race and outer race are rotated.

What is claimed is:

1. A selectable clutch comprising:
    an inner race and an outer race provided to be coaxial and rotatable relative to each other;
    a plurality of cams disposed between the inner race and the outer race;
    a cage ring circumferentially holding the plurality of cams;
    a biasing means biasing each of the plurality of cams such that the plurality of cams come into contact with the inner race and the outer race; and
    a selector configured to be able to forcibly tilt each of the plurality of cams,
    the plurality of cams each being configured to have a center of gravity located such that each of the cams functions as an engaging type cam when the cams are oriented in engagement with the inner race and the outer race, and such that each of the cams functions as a disengaging type cam when the cams are in a tilted freewheel orientation not to contact with the inner race or the outer race,
    wherein the selector is configured to move in a circumferential direction to forcibly shift a position of the center of gravity of each of the plurality of cams with respect to the circumferential direction to cause each of the cams to switch between functioning as the engaging type cam and functioning as the disengaging type cam,
    wherein the center of gravity of each of the cams is positioned on an opposite side to an inner contact point of contact between the cam and the inner race relative to a normal line at an outer contact point of contact between the cam and the outer race when the cams are oriented in engagement with the inner race and the outer race, and positioned on a same side as the inner contact point when the cams are in the tilted freewheel orientation.

2. The selectable clutch according to claim 1, wherein the plurality of cams each include:
    a constricted part that is circumferentially recessed in a radially central portion;
    a head part that is on a radially outer side of the constricted part and held by the cage ring; and
    a leg part that is on a radially inner side of the constricted part and held by the selector,
    the center of gravity of the cams being positioned on the radially outer side of the constricted part.

3. The selectable clutch according to claim 1, wherein
when functioning as the engaging type cam, each of the cams is tilted in an engaging direction by a rotational moment of inertia when a centrifugal force is applied, and
when functioning as the disengaging type cam, each of the cams is tilted in a disengaging direction by the rotational moment of inertia when the centrifugal force is applied.

4. A selectable clutch comprising:
an inner race and an outer race provided to be coaxial and rotatable relative to each other;
a plurality of cams disposed between the inner race and the outer race;
a cage ring circumferentially holding the plurality of cams;
a biasing means biasing each of the plurality of cams such that the plurality of cams come into contact with the inner race and the outer race; and
a selector configured to be able to forcibly tilt each of the plurality of cams,
the plurality of cams each being configured to have a center of gravity located such that each of the cams functions as an engaging type cam when the cams are oriented in engagement with the inner race and the outer race, and such that each of the cams functions as a disengaging type cam when the cams are in a tilted freewheel orientation not to contact with the inner race or the outer race,
wherein the center of gravity of each of the cams is positioned on an opposite side to an inner contact point of contact between the cam and the inner race relative to a normal line at an outer contact point of contact between the cam and the outer race when the cams are oriented in engagement with the inner race and the outer race, and positioned on a same side as the inner contact point when the cams are in the tilted freewheel orientation.

5. A selectable clutch comprising:
an inner race and an outer race provided to be coaxial and rotatable relative to each other;
a plurality of cams disposed between the inner race and the outer race;
a cage ring circumferentially holding the plurality of cams;
a biasing means biasing each of the plurality of cams such that the plurality of cams come into contact with the inner race and the outer race; and
a selector configured to be able to forcibly tilt each of the plurality of cams,
the plurality of cams each being configured to have a center of gravity located such that each of the cams functions as an engaging type cam when the cams are oriented in engagement with the inner race and the outer race, and such that each of the cams functions as a disengaging type cam when the cams are in a tilted freewheel orientation not to contact with the inner race or the outer race,
wherein the selector is configured to move in a circumferential direction to forcibly shift a position of the center of gravity of each of the plurality of cams with respect to the circumferential direction to cause each of the cams to switch between functioning as the engaging type cam and functioning as the disengaging type cam,
wherein
when functioning as the engaging type cam, each of the cams is tilted in an engaging direction by a rotational moment of inertia when a centrifugal force is applied, and
when functioning as the disengaging type cam, each of the cams is tilted in a disengaging direction by the rotational moment of inertia when the centrifugal force is applied.

\* \* \* \* \*